Dec. 12, 1967    J. T. SILER    3,357,730

METHODS AND MEANS FOR PARTS ASSEMBLY

Original Filed Oct. 27, 1961    4 Sheets-Sheet 1

INVENTOR
Joseph T. Siler

Ashley & Ashley
BY
ATTORNEYS

Dec. 12, 1967     J. T. SILER     3,357,730

METHODS AND MEANS FOR PARTS ASSEMBLY

Original Filed Oct. 27, 1961     4 Sheets-Sheet 3

INVENTOR
Joseph T. Siler

BY Ashley & Ashley

ATTORNEYS

Dec. 12, 1967  J. T. SILER  3,357,730
METHODS AND MEANS FOR PARTS ASSEMBLY
Original Filed Oct. 27, 1961  4 Sheets-Sheet 4

INVENTOR
Joseph T. Siler
BY
ATTORNEYS

United States Patent Office 3,357,730
Patented Dec. 12, 1967

3,357,730
METHODS AND MEANS FOR PARTS ASSEMBLY
Joseph T. Siler, 203½ E. Virginia,
McKinney, Tex. 75069
Original application Oct. 27, 1961, Ser. No. 148,190, now Patent No. 3,257,720, dated June 28, 1966. Divided and this application Apr. 29, 1963, Ser. No. 276,560
6 Claims. (Cl. 287—189.36)

This invention relates to new and useful improvements in methods and means for parts assembly.

This application is a division of my copending application, Ser. No. 148,190, filed Oct. 27, 1961, now U.S. Patent No. 3,257,720 and relates in certain respects to my copending application Ser. No. 137,166, filed Sept. 11, 1961, now U.S. Patent No. 3,158,045, and to my U.S. Patent No. 3,006,443, issued Oct. 31, 1961, and reference is made thereto.

The invention is particularly directed to improved methods and means for alining two or more parts as may be desired and for securing said parts together in such alined position, and in making provision for such alinement and the passage of fastening elements through the parts without misalinement thereof or disturbing of such previously determined positions. Thus, in one respect, the invention is concerned with the attaching or securing of one part to another in a precise and predetermined position, coupled with arrangements allowing the removal of such part and its replacement in such previously determined precise position or its replacement by a substantially identical replacement or interchangeable part without loss of the precise alinement and positioning desired.

In fastening together parts an assembly, each of which may be considered interchangeable with other substantially identical parts, certain factors in the detail parts and in their relationship to each other must be maintained if a given set of physical characteristics is to exist in the finished assembly. These factors are:

(1) The physical outline of each detail part must be essentially the same as every other substantially identical detail part within the allowable tolerances present.

(2) The detail parts must mate together in essentially the same physical location in reference to each other in all assemblies and again within the allowable mismate tolerance which is present. This is "part shift."

(3) Once the detail parts have been placed in juxtaposed relationship the pre-formed fastening holes must be in alinement in order to receive fastening members therethrough.

In certain parts which are classified "interchangeable at attaching points only" factor (1) above is excluded and the physical outline of the part is altered on assembly to physical compatibility with the physical outlines of adjacent parts. Complete interchangeability, which involves all three factors, including factor (1), is considered to be present in the discussion herein of the improved methods and means, but factor (1) need not necessarily be present to practice the improved methods and utilize the improved means.

The invention will be described largely with respect to its utilization in the assembly of aircraft structures since aircraft assemblies in most cases involve close tolerances, high loadings or low safety factors, critical limitations as to the placing of and the oversize allowance of fastener openings or holes, and other characteristics rendering the present invention particularly adaptable to that field. It is to be noted, however, that the invention is equally applicable to all types of mechanical assemblies where high accuracy of part alinement and location as well as fastener opening alinement and structural superiority is necessary and desirable.

In carrying out the invention one or more locator openings or holes are formed in each of the parts to be joined, and bushings having fastener receiving bores are positioned in said openings, the locator bushings having their bores formed concentrically, or possibly with a relatively slight amount of eccentricity. The locator openings are necessarily positioned with very exacting accuracy and to relatively small tolerances. One of the locator openings or holes should also be designated as a dimensional reference hole, from which the position of all other fastener openings or holes are measured to prevent tolerance build up, and should be positioned within the applicable tolerances to provide the desired edge distances in the parts to be joined, that is, the maintaining of the distances of the holes in the two mating parts at this particular fastening location spaced as equally as possible or as may be desired from the nearest adjacent edges of the two parts. The dimensional reference locator hole may also be located to close tolerances in relation to other physical points of important relativity between the parts joined.

Following the foregoing, the remainder of the fastener holes may be located with somewhat larger tolerances, and fastener bushings of greater eccentricity in respect to their fastener receiving bores positioned therein and adjusted for alinement of said bores.

It is, therefore, a principal of the invention to provide improved methods and means for fastening together mating parts with extreme accuracy of alinement and fastener bore location.

A further object of the invention is to provide improved methods and means of the character described in which all necessary adjustments may be made from one side of the mating parts.

A still further object of the invention is to provide improved methods and means of the character described by which greater strength may be imparted to a joint without necessarily increasing the strength of the fastening element; and which, in addition, permits the fullest use of high strength fastening elements of minimum size or diameter.

An additional object of the invention is to provide improved methods and means for fastening together mating parts through the use of which part shifts between the parts under loads are precluded even though the fastening elements may not have been tightened as fully as desirable or when undetected tolerance build ups may have allowed some looseness in the bushing-hole fit.

Another object of the invention is to provide improved methods and means for fastening together mating parts which permit the use of lighter fastening elements without any sacrifice in strength, and by which a multiplicity of methods of fastener application may be carried out.

A further object of the invention is improved methods and means of the character described with which may be utilized virtually any of the existing types of self-locking fasteners and/or fasteners designed to ensure a predetermined tightening torque.

Yet another object of the invention is to provide improved means for fastening together mating parts which makes provision for increased joint strength at the points or planes of greatest stress.

An additional object of the invention is to provide an improved means for fastening together mating parts which provides for the use of a counter-sunk bolt without appreciable loss of strength, resulting in reduced projection of the fastener and better clearance in conditions of reduced clearance with adjacent parts, while simultaneously resulting in a decreased total weight of the fastening elements.

Stil lanother object of the invention is to provide an improved joint forming method in which one or more locator fastenings are positioned with great accuracy whereby remaining fastening holes may require less accuracy of location.

A construction designed to carry out the invention will be hereinafter described, together with other features of the invention.

The invention will be more readily understood from a reading of the following specification and by reference to the accompanying drawings, wherein examples of the invention are shown, and wherein:

FIG. 13 is a bottom plan view of the fastener of FIG. 12, FIG. 14 is a vertical, longitudinal, sectional view taken on the line 14—14 of FIG. 13.

In carrying out the invention, several different methods may be followed in positioning the holes in the parts for receiving the fastening members and for alining the fastener bushings or locator bushings therein. One method for attaching mating or juxtaposed parts for full interchangeability of the parts utilizes two locator holes in each part accurately located in relation to each other and preferably located in opposite corners or diagonally or diametrically opposed portions of each part. The use of these two accurately positioned locator holes in each mating part satisfies the requirements of factor (2), listed hereinabove, and permits the requirements of factor (3) to be met through the use of locator bushings having only a relatively small amount of eccentricity. It is also possible to use concentric locator bushings for these locator holes if the tolerances of the center line locations of the locator holes are held extremely close and a slight amount of oversize or "slop" is allowed in the fastener-bushing-and/or bushing-bushing hole fits. The amount of tolerance permissible in regard to mismate of the mating parts (part shift) determines the degree of tolerance fineness necessary for the location of the locator holes. Concentric locator bushings without appreciable oversize in the holes receiving the bushings or in the holes receiving the fasteners would necessitate tolerances for the location of the center lines of the holes of approximately ±0.0005 inch. No part shift mismatch would be discernable between the parts. On the other hand, if a part shift mismatch of 0.010 inch is permissible, locator bushings with 0.005 inch eccentricity would be allowable as would tolerances for the center line location of the locator holes of ±0.007 inch, as will be explained hereinafter. Since a primary objective of the invention, however, is to reduce the part shift between the mating parts to a practical value not otherwise readily obtainable without tedious and time-consuming machining operations to locate the locator openings to very small tolerances, somewhat more accurate positioning of the locator holes becomes desirable.

In order to explain the importance of the tolerances on locator hole center line location dimensions, and to show why much less exacting tolerances are required to mate two holes rather than three or more holes, it will be well to state certain basic facts.

(a) In order to prevent tolerance build up all hole location dimensions must be referred to a dimensional reference hole which, as pointed out above, is desirably one of the locator holes.

(b) It may now be seen that when the dimensional reference holes in each part are perfectly alined and all location dimensions or fastener holes are located from the dimensional reference holes, that the maximum hole misalinement possible is as great with three holes as it is with any larger number of holes.

(c) In studying the initial mating of the parts at the locator holes it can now be seen that mating two hole locations requires tolerances which are only one-half as severe as when three or more hole locations are mated. This is true because the required shift may be absorbed one-half by each part so that the small amount of shift involved from true alinement will have little effect on the alinement of the remaining holes, and in practical usage is most often taken care of by probability factors unless the initial part shift is inordinately large.

Figure 1:
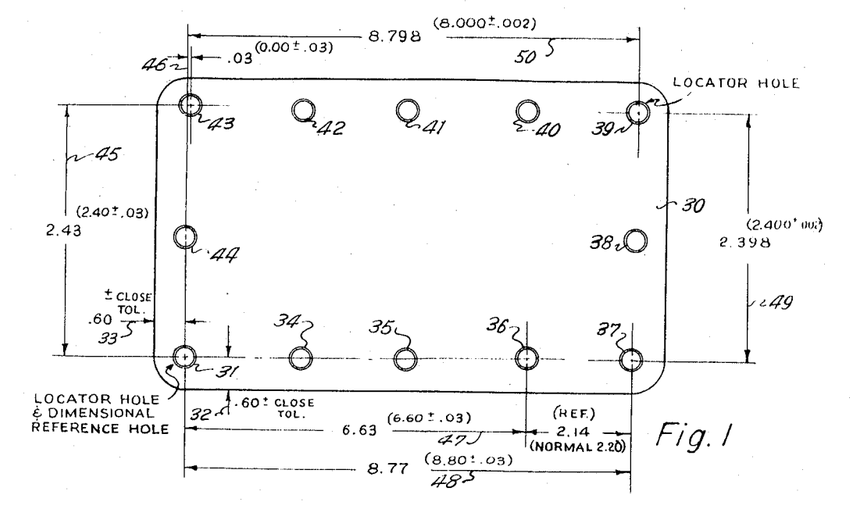
FIG. 1 is a front elevationnal view of a closure plate illustrating the carrying out of the methods and means of this invention.
Figure 2:
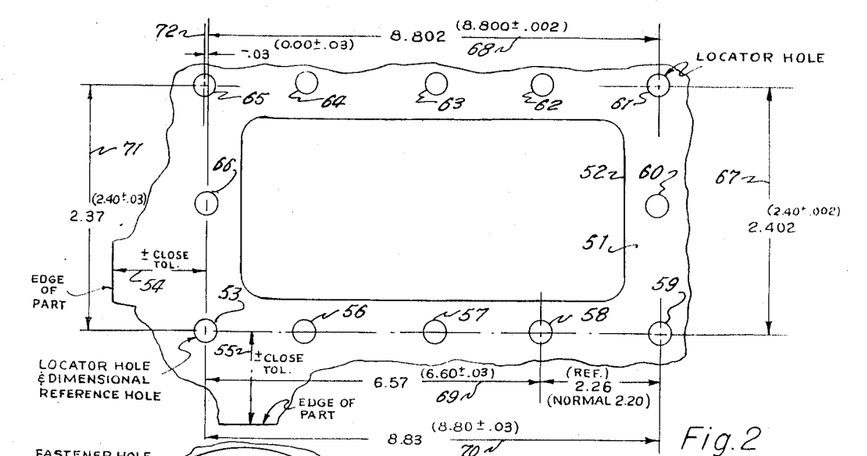
FIG. 2 is a front elevational view, partly broken away illustrating the part mating with the part illustrated in FIG. 1.
Figure 3:
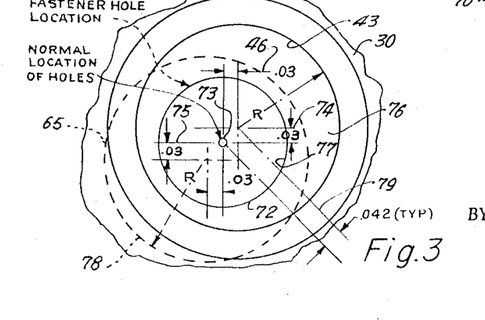
FIG. 3 is a diagrammatic view illustrating the methods of solving the problem of fastener hole eccentricity or misalinement.

This is illustarted in FIGS. 1 through 3 in which the numeral 30 designates an approximately rectangular closure door or plate having in its lower left-hand corner a counterbored locator bushing opening 31 very accurately positioned with respect to the edges of the plate 30 as indicated at 32 and 33. Locator hole 31 may also be designated as the dimensional reference hole. Beginning with locator hole 31, the remaining bushing holes in plate 30 have been numbered counterclockwise 34 through 44, it being noted that hole 39, diagonally opposite locator hole 31 may also be a locator hole, but that only hole 31 functions as the dimensional reference hole. Thus, as indicated at 45 and 46, hole 43 is located with respect to hole 31, hole 36 is also located with respect to hole 31 as indicated at 47, hole 37 is located with respect to hole 31 as indicated at 48, and locator hole 39 is positioned with respect to locator hole 31 as indicated at 49 and 50.

The part 51 which mates with plate 30, and which might be the skin of the aircraft or any other member, is shown in FIG. 2 and is provided with a central access opening 52, which is to be covered or closed by the plate 30, surrounded by a plurality of bushing openings which may or may not be counterbored or countersunk from either side of the member depending upon the type of bushing to be used. The hole 53 which is to register with hole 31 and which is both a locator hole and a dimensional reference hole again is very accurately positioned to close tolerances either with respect to the edge of the part as indicated at 54 and 55 or with respect to the margin of the opening 52, or both. It might also be positioned with respect to some other point of relative positional importance (not shown). The bushing openings in member 51 are numbered from 56 through 66 proceeding counterclockwise from locator hole 53. Again, hole 61 may be a second locator hole and is positioned to close tolerances with respect to hole 53 as indicated at 67 and 68, and locator hole 61 is, of course, the hole adapted to register or nearly register with locator hole 39 in plate 30. The remaining bushing openings are located with respect to locator hole 53 with somewhat larger tolerances, as indicated at 69 for hole 58, 70 for hole 59, and 71 and 72 for hole 65. For purposes of illustration, a tolerance of ±0.002 inch has been permitted for positioning of the second locator holes 39 and 61, and a tolerance of ±0.03 inch for location of the remaining bushing openings. To illustrate the maximum misalinement of the bushing openings other than the locator holes which may occur under the designated tolerance, hole 43 in plate 30 deviates from its correct position by 0.03 inch both vertically and horizontally, and the corresponding bushing opening 65 in member 51 correspondingly deviates the maximum distance permissible both vertically and horizontally but in directions opposite to hole 43. Thus, a mismatch of 0.06 inch in both the vertical and horizontal directions occurs between this pair of holes.

As noted above and as will be discussed more fully hereinafter, either concentric locator bushings may be utilized at one or both of the locator hole positions in each part, slightly eccentric bushings may be utilized in one or both locator hole positions of each part, or a combination of concentric bushings at one locator position and bushings of slight eccentricity at another locator position may be used. In the remaining bushing openings, fastener bushings of somewhat greater eccentricity would be employed, and the necessary eccentricity is illustrated diagrammatically in FIG. 3 wherein misalined openings 43 and 65 are used as an example. The correct or proper location of the center lines of the fastening openings is indicated at 73, it being noted that the center line of opening 43 having a radius R is off by 0.03 inch both upwardly and to the right as indicated at 74 and 46, while the center line of opening 65, of radius R, is off 0.03 inch to the left and downwardly, as indicated at 72 and 75. Thus, the distance between the center lines of the two openings is 0.06 inch. In order to accommodate this misalinement, a bushing 76 having an eccentric bore 77 is positioned in hole 43, and a bushing 78 having a similar eccentric bore is positioned in hole 65. The bushings may be rotated in the bushing holes until their bores are exactly alined, as shown in the illustration in FIG. 3, such adjustment being made half by one bushing and half by the other, as indicated at 79. The eccentricity of the bores of each bushing must be at least 0.042 inch if the permissible tolerance in location of the bushing openings is ±0.03 inch, this amount of eccentricity being calculated at 0.03 inch times the secant of 45°.

Similar locator bushings with either concentric bores or very slightly eccentric bores may be used in either pair or both pairs of locator holes 31 and 53, and 39 and 61. Assuming for the locator holes a tolerance of ±0.002 inch, and following the above illustration, if concentric locator bushings are used in holes 31 and 53, locator bushings having an eccentricity of a minimum of 0.000 inch may be used in locator holes 39 and 61, this figure being obtained by multiplying the tolerance of 0.002 inch by the secant of 45°. If, however, a part shift of 0.003 inch between the plate 30 and the member 51 is permissible, locator bushings having an eccentricity of only 0.0015 inch may be employed in all four locator holes so that one-half the deviation of locator holes 39 and 61 may be accommodated in the locator bushings therein, and one-half accommodated by the locator bushings in the locator holes 31 and 53. In other words, one-half of the mismatch is assumed in each pair of locator holes. Conversely, it is possible to use four locator bushings with an eccentricity of 0.0003 inch as originally, and a larger hole locational tolerance of ±0.004 inch in mating the two locator hole positions. In this case, however, the permissible part shift must be 0.006 inch. Small amounts of part shift from true alinement between the plate 30 and the member 51 will have little if any effect upon the alinement of the remaining bushing holes adapted with the bushings of larger eccentricity, and as a practical matter is taken care of by probability factors unless the eccentricity of the bushings employed in the locator holes is inordinately large.

In view of the foregoing, it is to be noted that several locator methods may be employed for attaching plate 30 to member 51 in properly alined position and with proper alinement between the several fastening openings.

In the first method, four locator holes in two locator positions are employed in the mating parts as indicated at 31, 39, 53 and 61 in FIGS. 1 and 2, and locator bushings of very small eccentricity employed in the locator holes, the magnitude of the eccentricity being determined as recited hereinabove by the permissible tolerance in the location of the center lines of the second pair of locator holes with or without the permissible part shift between the two parts being taken into consideration, the latter being a function of the character of the interchangeable assembly. The remaining bushing holes are then positioned to somewhat larger tolerances and receive fastener bushings having fastening receiving bores of a correspondingly greater eccentricity.

The second locator method employs again four locator holes in two locator positions, one pair of locator holes receiving locator bushings with concentric bores located preferably in the dimensional reference locator hole. As contrasted to the first method, the eccentricity of the locator bushings utilized at the second set of locator holes will be twice that used in method one for similar tolerances on the location of the center lines of the second pair of locator holes. The use of concentric locator bushings in locator holes 31 and 53 prevents part shift, except that of an angular nature. Again, in the remaining bushing holes, fastener bushings of somewhat larger eccentricities are employed.

In a third method, four concentric locator bushings are utilized in two locator hole positions which requires extremely close locator hole location tolerances of some slight degree of looseness of fit between locator bushing and locator hole or between locator bushing and fastener or some combination of these three factors. An alternate to the third method would utilize conventional fastening devices, locator pins, etc., without busings in both locator hole positions in which case some degree of looseness of fit would be necessary in the locator holes varying in accordance with the tolerances to which the center lines of the holes may be held. Again, in both cases, the remaining bushing holes utilize fastener bushings or relative larger eccentricity.

A fourth method utilizes two concentric locator bushings in one locator hole position, this being the dimensional reference hole with no second locator position being employed and all the remaining bushing holes receiving fastener bushings of relatively large eccentricity as in previous methods. In this method, more angular part shift is possible and in certain cases this may be desirable for adjustment. Again, an alternate method would be to utilize a conventional fastener, locator pin, etc., in a single locator hole position rather than a concentric bushing. Or course, all other fastener openings would be positioned to somewhat larger tolerances and receive fastener bushings of greater eccentricity as before. Close center line hole locational tolerances for locator position number two are avoided using this method since no second locator position is employed.

It can be shown by diagrammatic load analysis that when eccentric fastener bushings are employed, and primarily where there is a considerable amount of eccentricity, there can occur a rotational tendency in the bushings when they are subjected to loading. On a practical basis this matter is controlled by a close fit of the fastener bushings in their holes and also by the friction engendered in the bushings and the mating parts particularly when the fastener is pulled down tight. In applications where large loads are encountered and failsafe methods are utilized extensively, however, the use of concentric or minutely eccentric locator bushings in the locator holes precludes the possibility of part shift under load even though the fasteners have not been pulled down as tight as is desirable or if undetected tolerance build-ups have allowed a loose fit of the eccentric fastener bushings in their holes. In this respect the concentric or minutely eccentric locator bushings provide for a sound structure where human errors may have occurred or vibration may have loosened the fastening members. The main point to consider in examining part shift under load is that the rate and direction of shift at each fastener point must be the same in order for part shift to occur when a multiplicity of fasteners are employed. Although this possibility is highly unlikely, it is not impossible, and accordingly, the use of concentric or minutely eccentric locator bushings in the fastening system eliminate even this extremely small chance of part shift under loading due to the rotational tendency of the eccentric fastener bushings.

Figure 4:
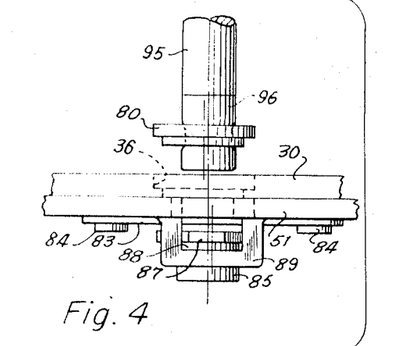
FIG. 4 is a side elevational view of an anchor nut type fastener constructed in accordance with this invention, along with the alining tool.
Figure 5:
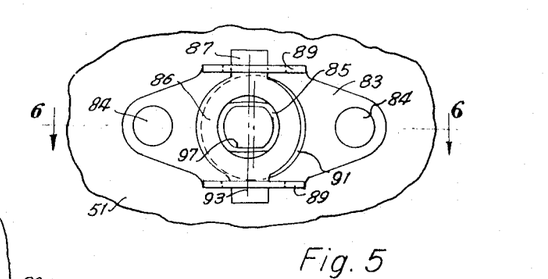
FIG. 5 is a bottom plan view of the structure of FIG. 4.
Figure 6:
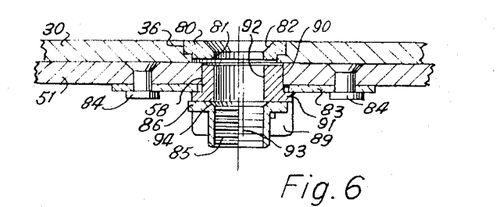
FIG. 6 is a vertical, longitudinal, sectional view taken on the line 6—6 of FIG. 5, showing upper flush bushing now alined and in place.

A specific embodiment of the invention in fastening bushings of the anchor nut type is illustrated in FIGS. 4, 5, and 6 which may be employed for instance, in fastener openings 36 and 58 of the closure 30 and member 51, respectively. The counterbored fastener opening in closure 30 receives a flanged fastener bushing 80 having an eccentric bore 81 which is bevelled or chamferred at 82 at its upper end for reception of the head of a countersunk bolt or other fastening member. An anchor 83 is suitably secured to the underside of the member 51 around the opening 58, as by the rivets 84 and carries a concentric nut member 85 having an external flange 86 at its upper end and a pair of diametrically opposed laterally extending tabs 87 received in oversize openings 88 provided in a pair of ears 89 depending from the anchor 83. The nut member 85 is thus securely connected to the anchor 83 but is free to undergo limited vertical and lateral movement while being held against more than a slight degree of rotation. A fastener bushing 90 fits within the fastener opening 58 of the member 51 and carries on its lower end an external flange 91 confined between the flange 86 of the nut member 85 and the underside of the anchor 83. The fastener bushing 90 is freely rotatable within the anchor 83 and is formed with an eccentric bore 92, the eccentricity of the bore 92 being indicated at 93. The bore of the nut member 85 is screw-threaded, and is chamferred at 94 at its upper end to facilitate insertion of a bolt thereinto, providing lateral translation into alinement with eccentric bore 92 of fastener bushing 90.

This fastener assembly is particularly useful in installations where access is available to only one side of the assembly in that a tool 95 having a relatively elongate tip 96 formed of rubber or some other suitable resilient or elastic material may be employed for adjusting both of the fastener bushings 80 and 90 from one side of the assembly. As shown in FIG. 4, the fastener bushing 80 may be slipped onto the tip 96, and the tip lowered through the fastener opening 36 to the eccentric bore 92 of the fastening bushing 90, the bushing 80 being manually rotated on the tip 96, and the bushing 90 being rotated by means of frictional engagement by the tip in order to bring the bores 81 and 92 into alinement and simultaneuosly position the bushing 80 in the fastener hole 36. Thereafter, the tool 95 with its tip 96 is withdrawn and a bolt introduced through the now alined bores 81 and 92 into the nut member 85. As the fastening member is tightened in the nut 85, there will be no tendency for either the bushing 80 or the bushing 90 to shift its position because the shank of the bolt will prevent such shifting. As is the case in all of the locator and fastener bushing discolsed and described herein, the bushings themselves are desirably and preferably made of relatively hard and strong material and receive bolts or other fastening members also formed of relatively hard and strong material so as to provide a very strong joint. Of course, the outer peripheries of the locator and fastener bushings being somewhat larger than the fastening bolt or fastening member, the bearing loads transferred to the closure 30 and member 51 are necessarily applied to a greater area, consequently further increasing the strength of the joint. It is to be noted that the adjacent ends of the bushings 80 and 90 are spaced slightly apart and do not extend entirely to the mating surfaces of the closure 30 and member 51 so that thickness tolerance variations in 30 and 51 do not prevent their physical frictional contact, and ensures adequate "pull down." Further, as shown in FIG. 5, the nut member 85 may be deformed, as illustrated at 97 in order to function as a self-locking nut which resists loosening under vibration or loading conditions.

Figure 7:
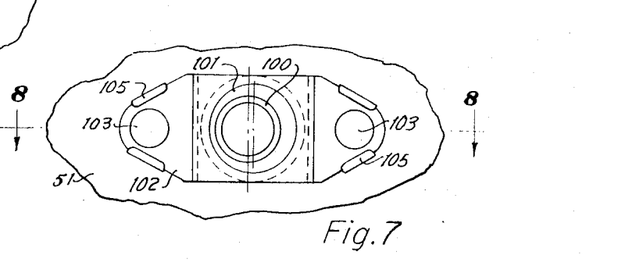
FIG. 7 is a bottom plan view of a modified form of an anchor nut fastener.
Figure 8:
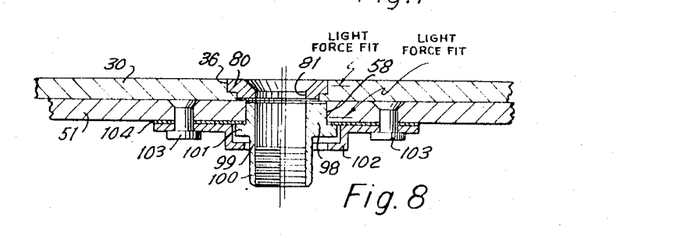
FIG. 8 is a vertical, longitiudinal, sectional view taken on the line 8—8 of FIG. 7.
Figure 9:
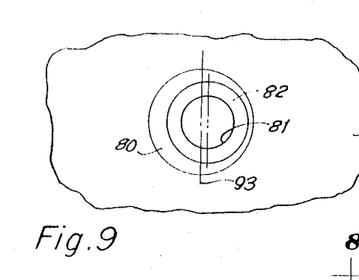
FIG. 9 is a top plan view of the form of the invention shown in FIGS. 7 and 8.

A modified form of the anchor nut fastener which may also be utilized in fastener openings 36 and 58 of closure 30 and member 51 is shown in FIGS. 7, 8, and 9 of the drawings. The same fastener bushing 80 is received in the fastener opening 36, but the fastener bushing-nut for the member 51 is made in one piece rather than two. The lower fastener bushing-nut is formed with an upstanding cylindrical collar 98 which is received in the fastener opening 58 and carries an eccentric bore 99 extending downwardly into a screwthreaded, dependent neck 100. An external flange 101 intermediate the collar 98 and neck 100 is confined within an offset cage 102 suitably secured to the underside of the member 51 as by the rivets 103. A thin metal plate 104 overlies the cage 102 and the flange 101 and is secured to the cage by folded-over ears 105 for securing the lower fastener bushing in the cage prior to the mounting of the cage on the member 51. The bores 81 and 99 are alined in the same manner as that described for the form of the invention shown in FIG. 4, it being noted that both the upper and lower fastener bushings are free to undergo unlimited rotation. It is further noted that when the fastener bolt or the fastening element is inserted in the bores 81 and 99 and into the threaded portion 100, there will be no rotation of lower fastener bushing because it and the upper fastener bushing are on different centers and thus hold each other against rotation as the bolt or fastening member is tightened into position.

Figure 10:
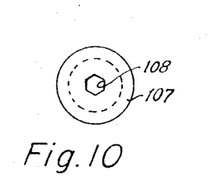
FIG. 10 is a top plan view of the fastening bolt adapted for utilization in the forms of the inventions shown in FIGS. 6 and 8.
Figure 11:
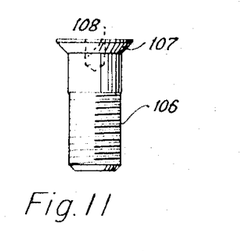
FIG. 11 is a side elevational view of the fastening bolt of FIG. 10.

In FIGS. 10 and 11 is shown a suitable bolt which may be utilized with either the nut plate fastener bushing of FIG. 4 or that of FIG. 8. The bolt carries the usual, partially screwthreaded shank 106 and has a bevelled head 107 fully receivable in the conical portion 82 of the bushing 80, there being provided a polygonal socket 108 in the center of the head 107 for reception of a suitable rotating tool, in the particular form shown, the conventional Allen wrench.

Figure 12:
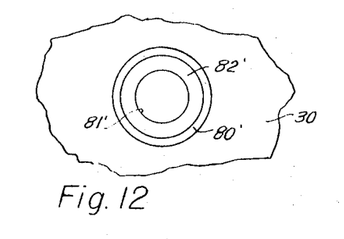
FIG. 12 is a top plan view similar to FIG. 9 but showing a concentric form of the anchor nut fastener.

A concentric locator bushing assembly which may be employed in the locator holes 31 and 53 and/or in the locator holes 39 and 61, is shown in FIGS. 12, 13, and 14. This concentric bushing assembly is identical to that shown in FIGS. 7, 8 and 9 with the exception that the bore 81' of the upper locator bushing 80' is concentric with respect to the bushing, and the bore 99' of the lower locator bushing is also concentric of the lower bushing. Otherwise, the concentric locator bushing assembly of FIGS. 12, 13, and 14 is identical to that shown in FIGS. 7, 8 and 9, and the parts thereof have been identified by the same numerals with a prime added. It should be noted, however, that it is possible to make the concentric locator bushing slightly smaller than its concentric counterpart making installation in the wrong hole less likely. There is one further important difference between the two bushings in that the flange 101 of the lower fastener bushing shown in FIG. 8 is circular so that the lower bushing may rotate freely, whereas the flange 101' of the lower locator bushing of the concentric modification is square or polygonal so as to hold the lower locator bushing against rotation within the cage 102'. Since the bores 81' and 99' are not eccentric and are axially alined, this polygonal flange is necessary to hold the lower locator bushing against rotation as a bolt or other fastener member is tightened thereinto.

Figure 15:
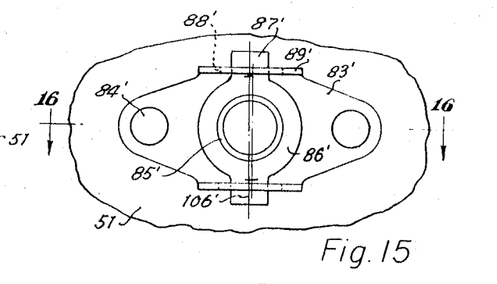
FIG. 15 is a bottom plan view of another form of the anchor nut fastener in which the fastening receiving bore has only slight eccentricity.
Figure 16:
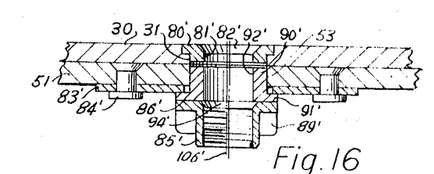
FIG. 16 is a vertical, longitudinal, sectional view taken upon the line 16—16 of FIG. 15.
Figure 17:
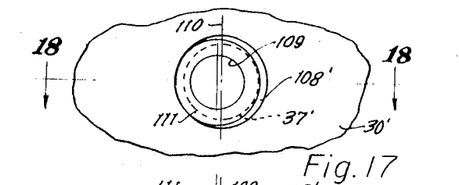
FIG. 17 is a top plan view of a protruding head form of the fastening bushing adapted to receive a countersunk bolt.
Figures 18, 19, 20, 21, 22, 23, 24:
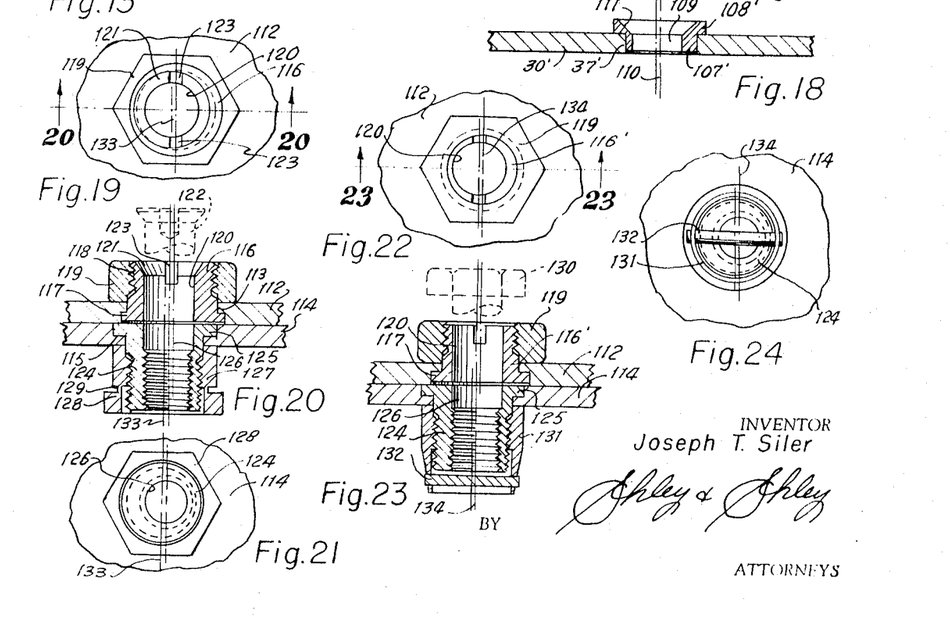
FIG. 18 is a vertical, longitudinal, sectional view taken upon the line 18—18 of FIG. 17.
FIG. 19 is a top plan view of still another modification of the invention.
FIG. 20 is a vertical, longitudinal, sectional view taken upon the line 20—20 of FIG 19.
FIG. 21 is a bottom plan view of the lower fastener assembly of FIG. 20.
FIG. 22 is a top plan view of yet another form of the fastener bushing assembly.
FIG. 23 is a vertical, longitudinal, sectional view taken upon the line 23—23 of FIG. 22.
FIG. 24 is a bottom plan view of the lower fastener assembly of FIG. 23.

In a similar fashion, and as illustrated in FIGS. 15 and 16, the fastener bushing assembly illustrated in FIGS. 4, 5, and 6 may also be made in either a concentric form or a very slightly eccentric form as indicated at 106'. Otherwise, the locator bushing assembly of FIGS. 15 and 16 is identical to that of FIGS. 4, 5, and 6 and the parts thereof have been identified by the same numerals with a prime added thereto. A very important modification of the upper fastener bushing is shown in FIGS. 17 and 18, this modification being of a low profile protruding head type in which there is no requirement for counterboring of the fastener holes. The plate 30' is provided with a cylindrical fastener opening 37' which receives a fastener bushing 107' having an annular, outwardly extending flange 108' on its upper end and being provided with an eccentric bore 109, the eccentricity being indicated at 110, terminating at its upper end in a chamferred or bevelled portion 111 for countersunk reception of the head of a fastening member or bolt such as that shown in FIGS. 10 and 11. As is the case with all of the fastener bushings disclosed, the bushing 107' is desirably or preferably made of relatively hard material and is adapted for use with bolts or other fastening elements also formed of hard, high strength material so as to provide a joint assembly of quite considerable strength due to the materials of the fastening member and the fastener bushing, as well as the increased bearing area between the bushing 107' and the walls of the fastener opening 37' of the member 30'. While this fastener structure is not completely flush, it has a low profile and may be readily employed in installations not requiring a completely flush fastener. The ease of forming the cylindrical fastener opening 37' as contrasted to the forming of a counterbored fastener opening facilitates considerably the ease of installation of the fastener bushing 107', and a low profile fastener assembly of considerable strength is provided. It is also an important feature of this modification that the weight of the fastener assembly is reduced considerably as compared to conventional high strength fastening assemblies that are currently available.

When access to both sides of the joint is available, the fastener bushing assembly may be modified as illustrated in FIGS. 19 through 21. This modification, as will be more fully explained, provides for an increase in the strength of the joint without enlargement of the fastening element making up the joint. This further modification involves an upper plate 112 having therein a fastener hole 113 counterbored from its lower end, and a lower plate 114 having therein a fastener hole 115 counterbored from its upper end. The upper fastener bushing 116 with its annular external flange 117 on its lower end is received in the hole 113 and carries an externally screwthreaded neck 118 extending upwardly above the plate 112 for reception of a lock nut 119. The bushing 116 is formed with an eccentric, fastening receiving bore 120 which is bevelled at its upper end at 121 for countersunk reception of a fastening member or bolt 122 of the type shown in FIGS. 10 and 11. There is also provided a pair of diametrically opposed screwdriver notches 123 in the upper end of the fastener bushing 116 for adjusting rotation of the fastener bushing 116 when the lock nut 119 is loosened.

The lower bushing 124 along with its annular external flange 125 at its upper end is received in the counterbore 115 of the plate 114, the bushing 124 having an eccentric bore 126 which is screwthreaded in its lower portion for reception of the bolt or fastener 122. The lower fastener bushing 124 projects downwardly from the lower plate 114 and is externally screwthreaded to receive a lock nut 127 of the controlled torque type. The nut 127 has a polygonal head 128 on its lower end and a break-neck groove immediately above the head 128 to form a thin wall annulus 129 immediately above the head 128. With this arrangement, after the fastener bushing 124 has been properly adjusted so as to aline its bore 126 with the bore 120 of the upper bushing, the lock nut 127 is tightened into position by a wrench or other tool applied to the head 128, torque being applied until the thin annular wall 129 shears or twists in two, thereby precisely determining the torque under which the nut 127 is tightened and making certain that the nut is tightened to the desired degree.

A somewhat similar arrangement is shown in FIGS. 22 through 24 the parts being identical except that the conical counterbore 121 of the upper fastener bushing 116' is omitted, the structure is designed to receive the machine bolt 130 rather than a countersunk bolt, and the lock nut 127 is replaced by a lock nut 131 extending below the lower end of the lower fastener bushing 124 and carrying in its lower extremity a transverse shear pin 132 which may be engaged by a suitable tool for tightening the lock nut 131 into position. Again, the utilization of the shear pin 132 places an exact limitation upon the torque under which the nut 131 is tightened, the user tightening the nut on the lower bushing until the pin 132 either shears or twists out of the lower end of the nut 131, thus making certain that the lock nut is tightened to the proper degree but is not tightened excessively. The eccentricities of the forms of the fastener bushings shown in FIGS. 20 and 23 are indicated at 133 and 134 respectively.

It is known that in joints of the type herein disclosed, the bearing loads across the shear joint are not uniform throughout the thicknesses of the plates being joined together but reach a peak at or near the faying or mating surfaces of the joined parts. This characteristic of this type of joint is fully discussed in Aircraft Structures, Peery, McGraw-Hill, first impression, second edition, 1950, pages 303–306.

The forms of the fastener assemblies illustrated in FIGS. 20 and 23 make provision for this concentration of bearing stresses that are near the mating faces of the plates 112 and 114 by positioning the portions of the fastener bushings having the greatest cross-sectional bearing areas, the flanges 117 and 125, at the faying or mating surfaces so that a greater diameter and cross-section of realtively hard metal or other material is so positioned as to be able to withstand more effectively these peak loading points. More importantly the flanges 117 and 125 bear against increased areas of the counterbored openings 113 and 115 which are usually relatively soft in comparison to the bushings and hence are enable to effectively reduce the bearing stress in the plates 112 and 114. By these structures, relatively small diameter high strength fastening members or bolts may be employed to provide a very strong joint of reduced weight and great resistance to shear loadings. Of course, each of these last described fastening assemblies may be readily adjusted for alining of the bores of the bushings, after which the bushings are locked into place as described.

Figure 25:
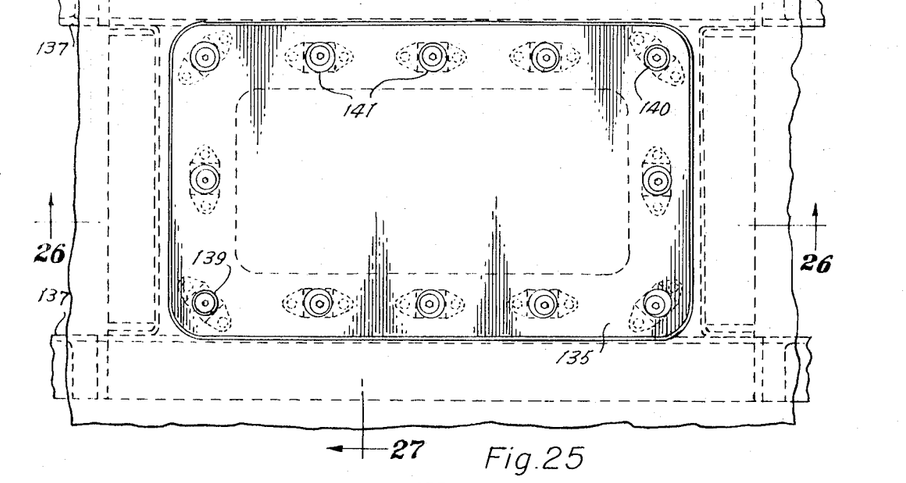
FIG. 25 is a plan view of an aircraft type stressed access door illustrating the utilization of the methods and means of this invention.
Figure 26:
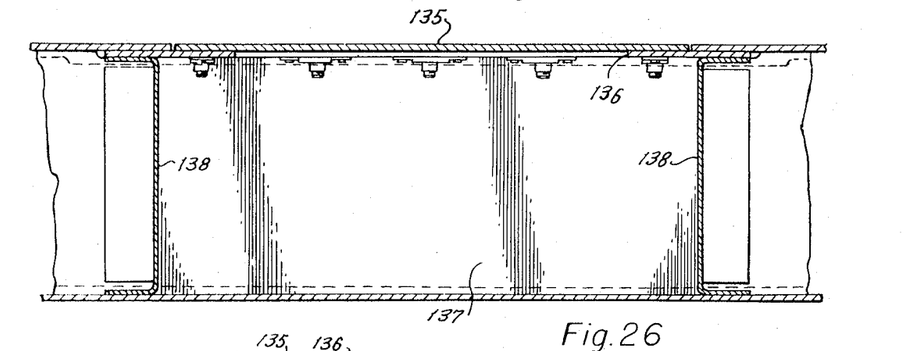
FIG. 26 is a vertical, longitudinal, sectional view taken upon the line 26—26 of FIG. 25.
Figure 27:
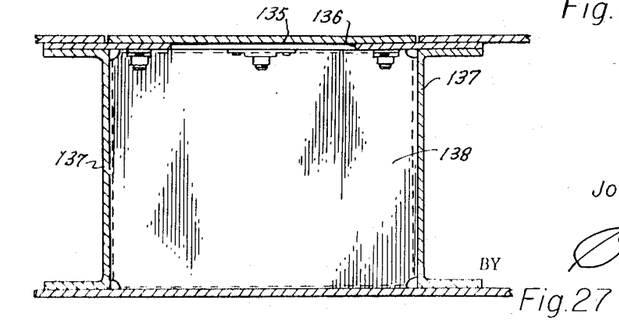
FIG. 27 is a vertical, transverse, sectional view taken upon the line 27—27 of FIG. 25.

In FIGS. 25–27, there is shown an aircraft type stressed access door 135, similar to the door 30 which covers an opening 136 surrounded by two beams 137 and two ribs 138 in a typical wing section. This structure illustrates a typical use of the concentric locator bushings of FIGS. 14 or 15, as well as the utilization of eccentric fastener bushings as illustrated in FIGS. 4 or 8. In such an assembly, access to the inner sides of the fastening assemblies is not available, and accordingly, following any one of the several methods of installation previously described, a locator bushing is installed in one corner position 139 to establish a first locator position and a dimensional reference position. This locator bushing would be of the concentric or the very slightly eccentric type. Depending upon the method being employed, a concentric, slightly eccentric locator, or markedly eccentric fastener bushing assembly is installed at the diametrically opposite fastening position 140, and fastener bushing assemblies of the greater degree of eccentricity are installed at the remaining fastener hole locations. After the door 135 has been alined and locked into position by either or both of the locator bushing assembly positions 139 and 140, the individual fastener bushings of the remaining assemblies are adjusted for hole alinement and bolts of the type shown in FIGS. 10 and 11 introduced thereinto.

In all of the several methods and structures set forth herein, at least one concentric or very slightly eccentric locator bushing assembly is employed in a locator position, and after the two parts are locked together in this manner, the remaining fastener bushing assemblies of somewhat greater ecentricity are alined and snugly secured.

Any of the various fastener bushings shown herein may be formed with concentric or slightly ecentric fastening-receiving bores so as to constitute locator bushings, or may be formed with greater eccentricities, as also shown.

As employed herein and in the claims appended hereto "locator bushings" means concentric bushing assemblies examples of which are shown and described, as well as bushing assemblies having an eccentricity compatible with and functioning within the limits of the permissible part shift between the parts. Thus, if the permissible part shift is 0.010 inch for a two part assembly, the locator bushings may have an eccentricity of 0.005 inch or less and if a part shift of 0.006 inch is permissible, the bushings may have an ecentricity of 0.003 inch or less. The tolerances for positioning the locator holes would follow automatically from the ecentricity of the locator bushings.

It is pointed out that any of the fastening nuts which receive the bolts or other fastening members may be of any of the numerous self-locking types but are not necessarily self-locking in structure since conventional nuts may also be employed. This applies, of course, to whichever of the bushing assemblies functions as a nut. In addition, any or all of the several forms of bushings described may have a light force fit in a small portion of the bushing so that as the assemblies are tightened down in final position there will be additional frictional engagement holding the bushings against any tendency to rotate or revolve and to require readjustment frequently. (See FIG. 8.) In all instances, of course, where one or two locator openings are located very accurately and employ one or more concentric bushings or bushings with very slight eccentricity, or in other words locator bushings, the parts are locked together in the specified location, and this prevents part shift, and ensures and maintains complete interchangeability of parts. Specifically, the locator holes may be and preferably are of different size from the remaining bushing holes if only for purposes of ready identification.

In most instances, the mating fastener bushings will be of the same eccentricity but in some cases it may be desirable to have mating or alining fastener bushings of differing eccentricity such as a location in which a considerable degree of adjustment is desired, but one of the mating parts might be able, because of available space or other reasons, to handle only a bushing of relatively small eccentricity. In such a case, the mating fastener bushing could be provided with a greater degree of eccentricity since the amount of adjustment or deviation is determined by the sum of the eccentricities of the two bushings. There are also other instances in which such pairs of fastener bushings of differing ecentricites may be desired or preferable.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A locator bushing assembly for a blind fastener for joining together two parts including a first locator bushing having an annular external flange having a continuous annular face engaging in its entirety one of the parts and an eccentric fastening receiving bore, and a second locator bushing for mating with the first bushing, said second locator bushing having an annular flange for engaging the other of the parts, the annular flange of the second locator bushing having a continuous annular face engaging in its entirety the other part, said second locator bushing being in the form of an anchor nut having a fastening receiving bore of an eccentricity different from that of the fastening receiving bore of the first bushing, and means for anchoring the second locator bushing to the other of the said parts, the second bushing being rotatable about its axis with respect to said latter part while maintaining its flange in engagement with said latter part.

2. A locator bushing assembly as set forth in claim 1 wherein the first and second locator bushings comprise a first set of locator bushings, and a second set of locator bushings comprising third and fourth locator bushings having fastening receiving bores of eccentricities differing from one another.

3. A locator bushing assembly as set forth in claim 1 wherein the first and second locator bushings comprise a first set of locator bushings, and a second set of locator bushings comprise third and fourth locator bushings having fastening receiving bores of the first and second locator bushings and of eccentricity differing from one another and from the eccentricities of the bores of the first and second bushings.

4. A locator bushing assembly as set forth in claim 1, an anchor plate securing the second bushing to other of said parts permitting free rotation of the second bushing with respect to said other of the parts, and an anchor nut anchoring the second bushing in the anchor plate and mounted for limited lateral movement in any direction.

5. A locator bushing assembly for a blind fastener for joining together two parts including a first locator bushing having an annular external flange having a continuous annular face engaging in its entirety one of the parts and an eccentric fastening receiving bore, and a second locator bushing for mating with the first bushing, said second locator bushing having an annular flange for engaging the other of the parts, the annular flange of the second locator bushing having a continous annular face engaging in its entirety the other part, said second locator bushing being in the form of an anchor nut having a fastening receiving bore of an eccentricity different from that of the fastening receiving bore of the first bushing, and means for anchoring the second locator bushing to the other of the said parts, the second bushing being rotatable about its axis with respect to said latter part while maintaining its flange in engagement with said latter part, the first and second locator bushings comprising a first set of locator bushings, and a second set of locator bushings comprising first and second locator bushings having fastening receiving bores of eccentricities differing from the eccentricities of the bores of the first and second bushings.

6. A locator bushing assembly for a blind fastener for joining together two parts including a first locator bushing having an annular external flange having a continuous annular face engaging in its entirely one of the parts and an eccentric fastening receiving bore, and a second locator bushing for mating with the first bushing, said second locator bushing having an annular flange for engaging the other of the parts, the annular flange of the second locator bushing having a continuous annular face engaging in its entirety the other part, said second locator bushing being in the form of an anchor nut having an eccentric fastening receiving bore, and means for anchoring the second locator bushing to the other of the said parts, the second bushing being rotatable about its axis with respect to said latter part while maintaining ts flange in engagement with said latter part, the first and second locator bushings comprising a first set of locator bushings, and a second set of locator bushings comprising third and fourth locator bushings having fastening receiving bores of eccentricities differing from the eccentricities of the bores of the first and second bushings.

References Cited

UNITED STATES PATENTS

| | | |
|---|---|---|
| 1,213,599 | 1/1917 | Dow. |
| 2,853,112 | 9/1958 | Poupitch _____________ 151—9 |
| 2,907,418 | 10/1959 | Hudson et al. _______ 141—41.76 |
| 3,066,443 | 10/1961 | Siler _________________ 85—1 |
| 3,041,913 | 7/1962 | Liska _________________ 85—1 |
| 3,077,960 | 2/1963 | Lang _____________ 287—189.36 |
| 3,123,120 | 3/1964 | Grimm et al. _______ 151—41.7 |

FOREIGN PATENTS 570,661   2/1959   Canada.

EDWARD C. ALLEN, *Primary Examiner.*

RICHARD W. COOKE, JR., *Examiner.*